Dec. 19, 1967  K. K. KAEMPFER  3,358,297
SINK FASTENER
Filed Nov. 19, 1965
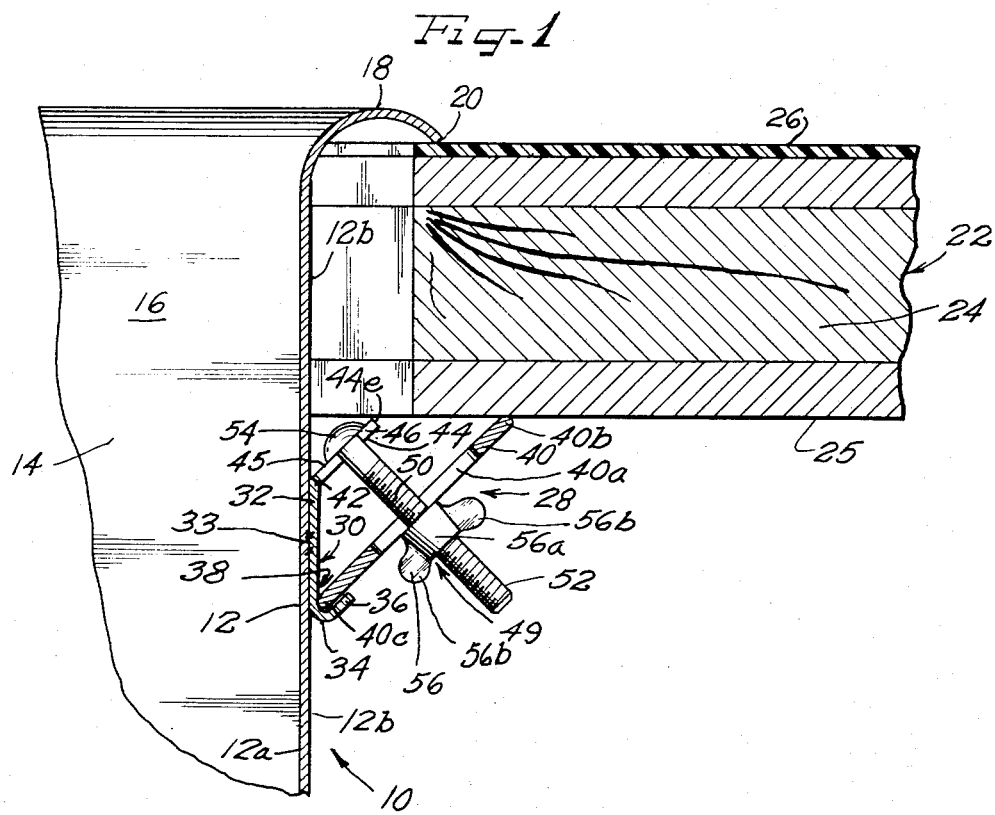
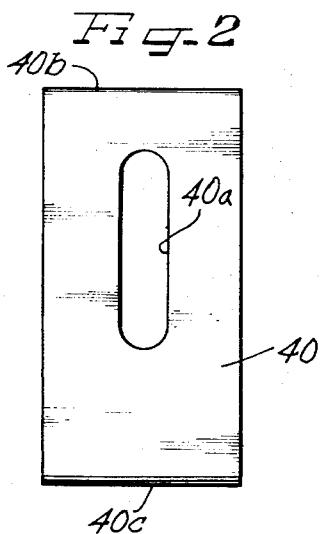
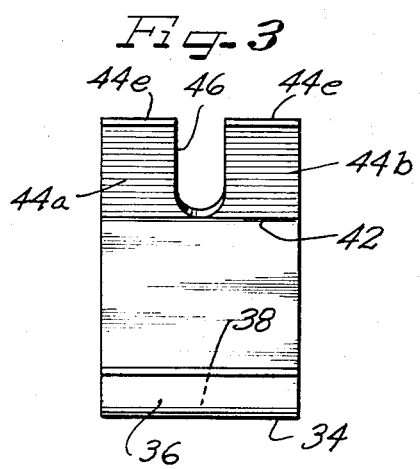
INVENTOR.
Karl K. Kaempfer
ATTORNEYS

# United States Patent Office 3,358,297
Patented Dec. 19, 1967

3,358,297
SINK FASTENER
Karl K. Kaempfer, Tucson, Ariz., assignor to H. D. Drain Corporation, Addison, Ill., a corporation of Illinois
Filed Nov. 19, 1965, Ser. No. 508,654
5 Claims. (Cl. 4—187)

The invention relates to sink fasteners which serve to draw the rim of a sink down tightly upon and over the top of an adjacent counter.

In the modern and efficient household kitchen, it is conventional to incorporate a countertop or working table adjacent to and contiguous with the sink at the height of the upper rim of the sink or sink cabinet. Such an arrangement increases the efficiency in using the sink. It is often desirable to provide such an arrangement with sinks used in industry and other environments. One problem of such an installation is the necessity for providing proper contact between the sink and the countertop. The sink is normally composed of stainless steel or porcelainated sheet metal. The countertop is usually constructed of wood, plywood or similar material. Protection must be provided against leakage of water between the counter and sink, and especially for the leakage of water into or below the normally water-proof countertop upper surface.

Often it is desired to have the countertop support the sink. It is also desirable that a sink fastener be adaptable to sinks of varying sizes and shapes.

Furthermore, whatever method of fastening is adopted for joining the counter to the sink it is desirable to provide considerable adaptability of the fastener to varying thicknesses and sizes of counters as it is desirable to provide for a fastener which does not occupy sufficient space about the sink to interfere with its use.

It is a principal object of the invention to provide a new and improved sink fastener for joining a sink and a countertop.

It is an object of the invention to provide a fastener which provides for easy installation.

It is another object to provide such a fastener which is adaptable to varying sizes of countertops and which may be used with varying sizes and shapes of sinks.

It is another object of the invention to provide such a fastener which allows for support of either the sink or the countertop by the other.

It is a further object to provide such a fastener which eliminates the need for special tools or for any tools in installation.

A still further object of the invention is to provide such a fastener which is of simplified and economical construction and operation.

In accomplishing these objects a novel fastener for use with a sink and a counter in accordance with the invention comprises seating means for receiving a bracing member, a bracing member seated within the seating means and extending between the sink and counter and adjustable bracing member positioning means for altering the angular position of the bracing member in the seating means.

The organization and manner of operation of the invention, together with further objects and advantages thereof may best be understood by reference to the following description taken in connection with the accompanying drawings, in the several figures of which like reference numerals identify like elements, and in which an exemplification of the invention is illustrated.

FIG. 1 is a side elevational view, partly in section, of a countertop and adjacent sink including a unique fastener constructed in accordance with the principles of the invention;

FIG. 2 is a vertical plan view of part of the fastener of FIG. 1; and

FIG. 3 is a plan view of another part of the fastener of FIG. 1.

Referring to FIG. 1, there is depicted a stainless steel kitchen sink generally indicated by the numeral 10. The sink 10 includes a side wall 12 defining with a backwall 14 and a bottom and oppositely disposed wall (not shown), a liquid-receiving sink basin 16. The sink basin 16 is conventionally provided with a water drain at its bottom for allowing the discharge of water or other liquids from the basin 16. The backwall 14 may flare outwardly from the basin 16 and conventionally include a shape portion for receiving a water faucet and valve assembly.

The sidewall 12 has an interior basin facing surface 12a and an exterior surface 12b. The upper portion of the wall 12 is flared outwardly and downwardly from the basin 16 to form an over-hanging arching rim portion 18 ending in a generally horizontal outer edge 20. The arching rim portion 18 overhangs and rests upon a countertop 22 which may be constructed of a plywood core 24 with a generally horizontal normally unfinished under surface 25 and a plastic coated or otherwise waterproofed generally horizontal upper surface 26. The countertop 22 lies in a horizontal plane along a desired extent of the rim portion 18 with the edge portion 20 of the rim portion 18 resting upon the plastic surface 26.

In accordance with the invention, also depicted in FIG. 1 is a unique sink fastener generally indicated by the numeral 28. The fastener 28 comprises a base member 30 which is preferably constructed from a single piece of stock sheet steel having a rectangular back portion 32 lying in a vertical plane juxtaposed to the outer surface 12b of the wall 12 and affixed thereto preferably by a spot weld 33 or by other suitable means. The bottom portion of the base member 30 is bent upwardly about a horizontal line in a hook-like shape (inside view) to form a bend or elbow 34 at the base of the back portion 32 and an upward protruding lip 36 which, together with the elbow or bend 34 and the back portion 32, forms a seating means or a trough-like seat 38 for receiving one edge end of a generally rectangularly shaped bracing member 40.

As may best be seen in FIG. 2, the bracing member 40 is of a generally rectangular shape and has an elongated longitudinal slot 40a centrally located along its transverse dimension. The member 40 is of a unitary construction, preferably of stock sheet steel and has two parallel transverse edges 40b and 40c, either of which may seat in seat 38 of the base 30. The slot 40a is located closer to the edge 40b and has sufficient transverse clearance to freely receive a shaft 50 (FIG. 1) of a screw 52 which, together with a wing nut 56, comprises adjustable bracing member positioning means. The slot 40a is narrow enough to stop a cylindrical part 56a of a wing nut 56 and cause that part to rest on the surface of the brace 40 abridging transversely the slot 40a. The wing nut 56 has a conventional threaded body portion 56a threaded on the shaft portion 50 of the screw 52. It is also provided with wings 56b for allowing easy normal turning of the nut 56.

For additional supporting contact between the brace 40 and the nut 56, a washer, preferably a locking washer, may be provided between these members.

The upper portion of the base member 30 is angled outwardly from the surface 12b of wall 12 about a horizontal line to form a second bend elbow 42 and a second lip portion 44 lying about a plane approximately parallel to the lip portion 36. The lip portion 44 has an upper surface 45 facing the wall surface 12b at an acute angle and a horizontal transverse upper edge 44e. As may best be seen in FIG. 3, the lip portion 44 has a centrally located generally U-shaped cutout 46 extending from its upper edge 44e to approximately the elbow portion 42. The cutout 46 divides the lip portion 44 into two protruding adjacent parts 44a and 44b. The width of the cutout 46 is such as to receive the elongated threaded shaft portion 50 (FIG. 1) of the screw 52 across the diameter of the shaft portion 50. The screw 52 has a wider head portion 54 for seating against the upper surface 45 of the lip 44 and for bridging the cutout 46 between the parts 44a and 44b. After assembly and installation, the fastener 28 forces the rim portion 18 of the sink 10 along its outside edge 20 downward into contact against the upper surface 26 of the wood counter 22 and hollows the sink and counter in the desired relationship by means of the compression upon the brace member 40.

For fastening the sink 10 to the counter 22, the sink is inserted into approximately its position adjacent the counter with the protruding 20 of the rim portion 18 resting lightly against the upper surface 26 of the counter 22. At this time, the screw 52, preferably containing loosely the brace member 40 between the head portion 45 and the extremely located wing bolt 56, is inserted so that the bolt shaft portion 50 passes through the cutout 46 of the upper lip portion 44 with the head portion 54 of the screw 52 resting against the upper surface 45. At the same time, the lower edge 40c of the brace member 40 is seated within the seat 38, formed by the elbow 34 and the lip portion 36 along the bottom portion of the base member 30. It should be noted that only the smallest clearance is needed above the edge 44e of the lip portion 44 to allow the screw 52 to enter the slot 46. However, even it may be eliminated by placing the screw 52 within the slot 46 prior to installation. If the shaft 50 of the screw 52 is of sufficient length it may be inserted within the seat 38 and allow the screw 52 to rest parallel to the wall 12 protected by the bracing member 30. In this case, the screw 52 would simply be advanced upward or sideways to clear the lip 36 and move outward to the center brace 40 and have the wing nut 46 threaded upon it.

With one edge 40b or 40c of the brace member 40 seating within the seat 38, the brace member 40 rests against the end seat 38 and the wing bolt 40 below the lower surface 25 of the counter 22. By manually adjusting the wing nut 56, and advancing it along the threaded shaft 50 of the screw 45 towards the head 54, the bracing member 40 pivotally moves about the seat 38 upwards into contact with the lower surface 25 of the counter 22. At this point the wing nut 56 is further tightened advancing the wall 12 and its outer rim flange 18 into compressive contact against the plastic upper surface 26 along the outer edge 20. At the same time, the upper edge 40b of the bracing member 40 is brought into compressive contact with the lower surface 25 of the counter 22 to thereby captivate and fasten the sink 10 to the counter 22.

As the wing nut 56 is advanced along a path (screw shaft 50) at an angle to the horizontal, a mechanical advantage is gained which allows even moderate force in tightening the wing nut 56 to exert a considerable force against the counter 22. This is an added advantage of the invention which allows for installation without the use of usual or special tools.

The sink 10 has been described as supported by the counter 22. It is of course equally possible for the fasteners to be used in the case of the counter 22 being supported by the sink 10 or when neither is to be supported by the other. It should also be noted that in most applications, the fastener 28 also provides horizontal support and protection against horizontal movement as one of the edges 40b or 40c embeds itself into the lower surface 25 and the rim edge 20 embeds itself into the upper surface 26 of the counter 22.

The fastener 28 may have a base portion forming a contiguous part of the sink 10.

The described construction provides a simply operated and inexpensive fastener which is easily adapted to the counters 22 of varying thickness. The provision of the U-shaped cutout 46 extending from the upper edge portion 48 into approximately the elbow portion 42 of the upper lip 44 of the base member 30 of the fastener 28 has the advantage of allowing both ease of insertion for the screw 52 therein and for lateral vertical movement of the screw therealong. The bracing member 40 and its elongated slot 46a is adapted for thin or thick counters 22 of wide range of sizes, as it allows the positioning of the screw member 50 and the wing nut 56 to seat at any longitudinal position therewithin. For extremely thick counters 22, the edge portion 40b near its elongated slot 45 should be inserted into the seat 38 so as to allow the bracing member 40 to assume an extreme angle relative to the wall portion 12. Alternatively, for very thin counters the edge 40c should be seated within the seating 38 to allow the bracing member to rest at a small angle relative to the wall 12 and thus accommodate the relatively narrow or thin counter 22. For even more narrow countertops 22, a longer bracing member 40 may be provided without changing the requirements of the brace backing 30, wing nut 56 or screw 52.

By means of illustration and example, the backing member 30 and the bracing member 40 may be constructed from 1/16 inch stock sheet steel with the member 30 having an overall vertical height of 3/4 inch with the lip portion 44 having a distance between the upper edge 44e and elbow bend 42 of approximately 3/8 inch. The corresponding transverse height would be approximately 3/4 inch with the transverse thickness of the cutout 46 being 3/16 inch. The member 40 would then be constructed of 1/16 inch steel sheet stock with an approximate transverse dimension of 3/4 inch and a longitudinal dimension of 1 1/2 inches. The elongated slot 45 could then have an approximate transverse dimension of 3/16 inch to receive a 3/16 inch, 24 thread, oval head machine screw of approximately 1 1/4 inches in length. The wing bolt 56 would then be a matching 3/16 inch, 24 thread wing bolt. The above dimensions are merely illustrative and fasteners embodying the principles of the invention may be constructed of numerous dimensions and shapes.

As is now apparent, a sink fastener of new and useful construction has been provided. The fastener provides secure binding between a counter and sink without tools or complicated procedures. The fastener of this invention is uniquely adaptable for a large variety of counter thicknesses and is of simplified and economic construction.

While a preferred arrangement and environment has been shown for the fastener it will be understood that the principles of the invention make it possible for the fastener to be applicable to any and all uses where a sealer, binder or fastener is required.

It will be understood that various modifications may be suggested by the embodiment disclosed, but I desire to claim within the scope of the patent warranted hereon all such modifications as come within the scope of my invention.

I claim as my invention:

1. In a fastener for use with a sink and a counter,
    seating means for receiving a bracing member affixed to the sink,
    a bracing member seated in said seating means and extending between the sink and the counter, and
    adjustable means to hold the bracing member in positive contact with said seating means and the underside of the counter, said adjustable means permitting alteration of the angular position of said bracing means in the seating means.

2. A fastener as set forth in claim 1 characterized by said seating means comprising
    a back,
        an integral upwardly opening hook-like lower portion in which said bracing member seats, and
        an outwardly bent upper portion, and
    said adjustable means being engaged with said upper portion and said bracing member.

3. A fastener as set forth in claim 1 characterized by said seating means comprising
    a back,
        an integral upwardly opening hook-like lower portion in which said bracing member seats, and
an outwardly bent upper portion,
said bracing member having an edge thereof in said hook-like lower portion with the opposite edge in position to abut the underside of the counter, and
said adjustable means extending at least in part through said outwardly bent upper portion and said bracing member.

4. A fastener as set forth in claim 1 characterized by said seating means comprising
 a back,
 an integral upwardly opening hook-like lower portion in which said bracing member seats, and
 an outwardly bent upper portion,
said upper portion having a slot therein,
said bracing member also having an elongated slot therein, and
a fastening element engaged in said slots, whereby said bracing member may be adjusted to fit variations in thickness of countertops.

5. A fastener as set forth in claim 1 characterized by said seating means comprising
 a back,
 an integral upwardly opening hook-like lower portion in which said bracing member seats, and
 an outwardly bent upper portion,
said upper portion having a slot therein,
said bracing member also having an elongated slot therein,
a headed bolt extending through both said slots, and a wing nut engageable with said bolt to anchor said bracing member in position without the use of tools.

References Cited
UNITED STATES PATENTS

| | | | |
|---|---|---|---|
| 2,303,634 | 12/1942 | Haberstump | 4—187 |
| 2,584,860 | 2/1952 | Galley | 4—187 |

HAROLD J. GROSS, *Primary Examiner.*